Figure 6:
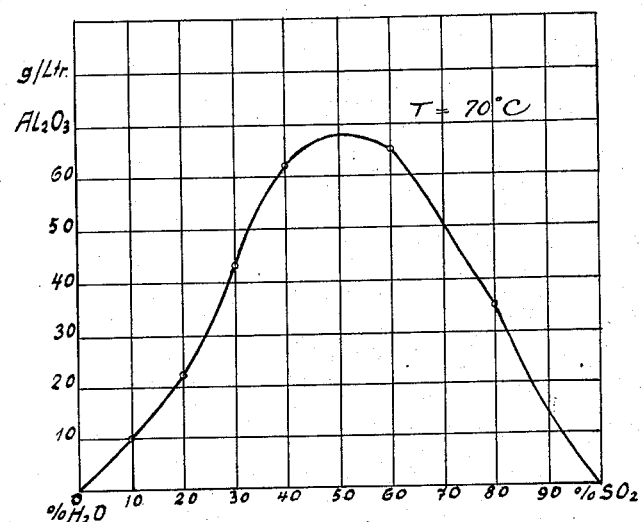
Figure 7:
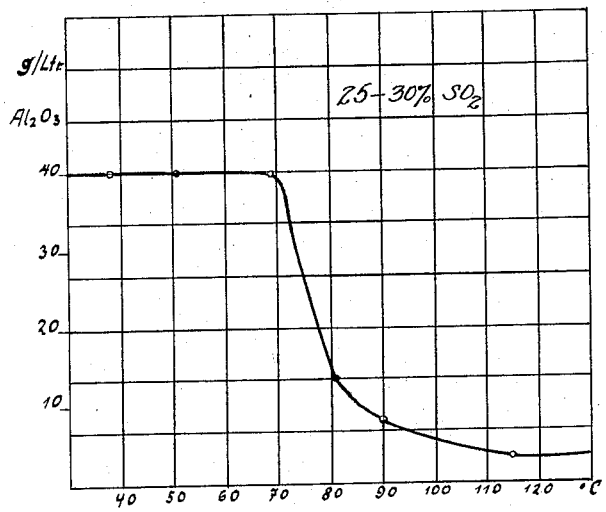

UNITED STATES PATENT OFFICE 2,006,851

PROCESS FOR THE DECOMPOSITION OF SILICEOUS ALUMINOUS MINERALS

Erich Wiedbrauck and Karl Büche, Essen-Ruhr, Germany, assignors, by mesne assignments, to Firm Th. Goldschmidt A.-G., Essen-Ruhr, Germany Application August 5, 1932, Serial No. 627,593 In Germany August 5, 1931

7 Claims. (Cl. 23—143)

This invention relates to a process of decomposing silicate minerals containing alumina for the production of alumina.

In the production of alumina for the manufacture of aluminum or aluminum compounds, it is usual to employ bauxites low in silica. From these bauxites, pure alumina is generally obtained by alkali methods, such as the well known Bayer method employing caustic soda solution or the Le Chatelier method using sodium carbonate. To a less extent, pure alumina is obtained from minerals high in silica, such as the kaolins, clays, leucites, high silica bauxites, etc. These materials occur in nature more extensively than high grade bauxite. The trouble with these siliceous minerals resides in the high silica content and the difficulty of separating alumina from silica in a complete and economical manner. Attempts have long been made to obviate these difficulties and render aluminum silicates available for the aluminum industry. For example, attempts have been made to decompose these minerals with strong acids, such as sulfuric acid, hydrochloric acid and nitric acid, or with their acid salts. The ammonium salts have been used. The difficulty arises that although alumina can be separated from silica in these methods, the iron, which is always present, also passes into solution and its separation from the alumina salts is difficult and costly. It is, moreover, difficult to recover the acids used for reuse, from these solutions. Any way of recovery involves extensive concentration and thermal decomposition of the salts.

It has been attempted to decompose certain aluminum silicates with weak acids, as for example, with sulfurous acid. The attempts, however, have been limited to the treatment of silicates of the sodalite or nepheline-syenite type; materials easily soluble in acids and containing besides alumina, silica and iron, considerable quantities of alkali compounds or alkaline earth compounds. Decomposition of these materials is comparatively easy. Treatment with weak sulfurous acid solution, even at the ordinary temperature, suffices to dissolve out most of the bases present in these minerals. Sometimes operation was warm; at temperatures not beyond 40° C.; that is, at temperatures resulting from the heat evolved by the chemical reaction. With these methods difficulty arises in the separation of the silica which goes into solution, together with the alumina, this necessitating troublesome heating and filtering steps.

Attempts to decompose more abundant and more resistant minerals, such as clays, kaolin, leucite, high silica bauxite, etc., by the methods used with these readily soluble mineral, have given unsatisfactory results. These materials usually contain only small proportions of the readily attackable complex double silicates of alumina and alkali ("aluminosilicates") of the type of those constituting sodalite and nephelinesyenite; they carry but little alkali. The quantity of alumina brought into solution by a treatment with sulfurous acid under conditions hitherto known in any practically applicable time does not warrant the operation. As we have found, it is only by using specific methods of operation, including higher temperatures, that satisfactory results can be obtained.

It has been found that not all high temperatures are applicable since in many cases the aluminum sulfite solutions obtained undergo decomposition with re-separation of some of the alumina originally dissolved, this representing a loss of alumina. The time factor, the age of the solution, is also important. In solutions made by the hereinafter described method and carrying dissolved aluminum sulfite, it is found that definite decomposition temperatures occur; these depending on the alumina concentration and the $SO_2$ concentration, or $SO_2$ pressure. The decomposability of these solutions with a rise in temperature increases with an increase in $Al_2O_3$ content and diminishes with an increase in $SO_2$ content, as shown in the following table:

| Composition of solution | | Decomposition temperature |
|---|---|---|
| $SO_2$ | $Al_2O_3$ | °C. |
| Percent | Percent | |
| 10.0 | 3.00 | 55 |
| 8.3 | 2.40 | 60 |
| 6.3 | 1.75 | 65 |
| 11.0 | 2.05 | 70 |
| 30.0 | 4.00 | 70 |
| 11.0 | 1.50 | 80 |
| 20.0 | 2.15 | 80 |
| 30.0 | 3.00 | 80 |
| 20.0 | 1.75 | 90 |

If an aluminum sulfite solution be heated above its decomposition temperature, it deposits alumina in the form of a basic aluminum sulfite. The reaction temperatures in the present operation must therefore be kept below this decomposition temperature.

In the accompanying drawing, we have shown, graphically, certain of the described relations.

Figure 1 illustrates the behavior of an aluminum sulfite solution at various temperatures. The curve illustrates the relation of the alumina concentration of the solution to the decomposition temperature of aluminum sulfite solutions. While aluminum sulfite solutions—even those of high concentration—are stable below 70° C., the drop in the curve above that point indicates a rapid decrease of the amount of alumina held in solution as the temperature rises above 70° C., even when the $SO_2$ is in considerable excess. Above 100° C., only small amounts of $Al_2O_3$ remain in stable solution.

The curve in Fig. 1 was obtained by heating various samples of an aluminum sulfite solution, containing 40 grams per liter $Al_2O_3$ and from 25 to 30 per cent $SO_2$ per liter, to the various temperatures indicated on the plot, then analyzing the resulting solution for its alumina content. The samples were maintained at the temperatures indicated for a period of 4 hours. It is shown by the plot that these samples remained stable during this heating period up to temperatures of about 70° C. At higher temperatures a decomposition occurred, part of the alumina precipitating out of solution, until at temperatures of 100° C. only small amounts remained in solution.

Furthermore, it has been found that the stability of aluminum sulfite in solution depends largely on the concentration of the sulfurous acid present. This in turn depends on the concentration of $SO_2$ in the system.

Figure 2 of the drawing shows the effect of the concentration of sulfurous acid in the solution with which clay is treated upon the solubility of the alumina or the amount of alumina extracted from the clay. The solubility values of $Al_2O_3$ are plotted as ordinates and the $SO_2$ concentrations as abscissae. The curve shows clearly that in extracting alumina from clay in sulfurous acid solution $Al_2O_3$ concentrations exceeding 20 grams per liter of solution, which is the lowest limit of practical utility, cannot be obtained except with $SO_2$ concentrations exceeding 10 per cent of the aqueous solution. Increase of the $SO_2$ increases the solubility of the alumina up to a maximum of about 68 grams per liter. It is thus clearly evident that in decomposing the clay it is desirable to operate with high concentrations of $SO_2$.

The curve in Fig. 2 was obtained by treating test samples of clay for 12 hours with solutions of $SO_2$ of varying concentration, as indicated on the plot, and then analyzing the resulting solutions for their content of $Al_2O_3$. The treatment was conducted in each instance at a temperature of 70° C. and the clay was kept in excess during the treatment. At temperatures other than 70° C. the curves obtained are very similar in character.

As regards the time required for decomposition of the clay, the general rule that time decreases with increasing temperature is valid.

We have found that agitation of the clay during its decomposition influences the stability of the aluminum sulfite solution extract and also influences the time required for decomposition of the clay. While agitation accelerates the decomposition of the clay, if the agitation is too violent deposition of alumina from the solution is also facilitated; an undesirable result high concentrations of alumina in the sulfurous acid extract are obtained by slow agitation during the treatment of the clay.

An important condition to be followed is that the temperature during the decomposition of the clay should be maintained below the decomposition temperature of the aluminum sulfite solution to be formed. Furthermore, it is desirable that for the decomposition of the clay an adequate quantity of sulfurous acid should be used; that an adequate amount of $SO_2$ be present. In practice the sulfurous acid may be added in proportion as it is consumed; as by leading in $SO_2$ gas. So doing, it is possible to effect decomposition of the clay without pressure and without using a great excess of sulfurous acid. It is however possible to add the total amount of the $SO_2$ at the start of the reaction. In such case, it is necessary to use closed vessels and to work under pressure. In order to avoid decomposition of the aluminum sulfite solution extract and to obtain high yields of alumina in highly concentrated solutions with a relatively short time needed for decomposition of the clay, it is advantageous to use sulfurous acid in excess by working under high pressures and at temperatures at which aluminum sulfite solutions are stable. An excess of $SO_2$ tends to prevent decomposition of the aluminum sulfite solutions.

In practicing the present invention, the clay or other siliceous aluminous mineral is usually first calcined in order to remove water of hydration and afterwards ground. The ground calcined material is treated with an aqueous solution of sulfurous acid at a moderately high temperature and under superatmospheric pressure. The sulfurous acid is best employed in excess and works as a supersaturated solution. In thus treating the clay, the alumina and iron contents are dissolved while the silica remains substantially undissolved. So working, alumina is extracted from the clay in yields up to 85 per cent and the solution extract reaches concentrations up to 50 grams $Al_2O_3$ per liter. The solution is separated from the siliceous residue or gangue by filtration. The aluminum salts of the weak acid being more readily decomposable by hydrolysis than the iron salts of the same acids, heating the solution extracts obtained in decomposing the clay, which extracts contain both the aluminum and the iron, if any, of the clay, effects a direct precipitation of the aluminum while iron salts remain in solution. The present process gives a direct separation of iron, thereby obviating an objection to most of the prior art methods in which the alumina recovered must be subjected to a troublesome after treatment to get rid of iron. Upon filtration, which is advantageously carried out under exclusion of air, the precipitated alumina is free from iron. It is a particular advantage of the process described that, as a result of the high alumina concentrations obtained in extracting the clay, the subsequently precipitated alumina compound is also nearly free of silica. The product of the process may be worked up in known ways to produce the pure alumina or aluminum salts.

Below are given three specific examples of our process invention.

*Example I*

The decomposition of calcined aluminous minerals by sulfurous acid at atmospheric pressure is effected as follows:

A lead-lined stirring vessel is charged with 25 liters of water and with 3.2 kilograms of calcined and ground clay containing 34.8 per cent of $Al_2O_3$. A weak current of $SO_2$ gas is passed into the vessel with slow stirring of the contents, the temperature being kept at about 55° C. The solution in the reaction mixture contains, at the end of:

3 hours, 0.75 per cent of $Al_2O_3$ and 2.4 per cent of $SO_2$ 12 hours, 1.55 per cent of $Al_2O_3$ and 6.25 per cent of $SO_2$ 24 hours, 2.55 per cent of $Al_2O_3$ and 8.30 per cent of $SO_2$ 36 hours, 2.85 per cent of $Al_2O_3$ and 9.65 per cent of $SO_2$ 42 hours, 3.00 per cent of $Al_2O_3$ and 10.00 per cent of $SO_2$ The yield of alumina is about 70 per cent. The solution is filtered off from the undissolved residue of silica and is treated for the production of basic aluminum sulfites.

If an accelerated reaction be desired, the operation may be performed in a closed stirring apparatus under pressure such as 1 to 5 atmospheres and a somewhat increased temperature (e. g. 50–70° C.), by introducing $SO_2$ gas continuously under pressure into the autoclave. At 2 atmospheres pressure and a temperature of 55° C. the extraction time amounts to 28 hours only and at a pressure of 4 atmospheres and 60° C. to 20 hours only.

Example II

The decomposition of aluminous materials with an excess of sulfurous acid at a superatmospheric pressure is performed in the following manner:

A crude clay containing:
34.5 per cent of total moisture
24.7 per cent of $Al_2O_3$
1.3 per cent of $Fe_2O_3$ small amounts of alkali and alkaline earth, and the remainder silica with a little $TiO_2$, is calcined for 3 hours at 600° C., losing 34.5 per cent of its weight, in the form of water. After calcination, the composition is:

37.8 per cent of $Al_2O_3$
2.0 per cent of $Fe_2O_3$
1.9 per cent of $TiO_2$ small amounts of alkali and alkaline earth, and about 58 per cent of $SiO_2$.

500 grams of this calcined and ground clay are treated with 6.4 liters of water and 1.2 kilograms of $SO_2$, in an acid-proof stirrer-autoclave, for 16 hours at 70° C. and under a pressure of about 9 atmospheres. Thereafter, the greater part of the sulfurous acid is allowed to blow off, the contents of the autoclave being cooled down, and the reaction mixture is filtered off from the undissolved residue—mainly silica—of the clay. The filtered solution contains:

2.5 per cent of $Al_2O_3$
0.14 per cent of $Fe_2O_3$
0.018 per cent of $SiO_2$
0.00 per cent of $TiO_2$ and traces of alkali and alkaline earth.

The yield from the decomposition is given in the following table in percentage of the substances present in the original clay:

85.0 per cent of $Al_2O_3$
90.0 per cent of $Fe_2O_3$
0.4 per cent of $SiO_2$ and
0 per cent of $TiO_2$.

Steam is blown directly into the solution, until the escape of $SO_2$ ceases. At the same time, 840 grams of a white salt separate out and are then filtered off from the solution out of contact with air. The precipitated salt has the composition:

19.2 per cent of $Al_2O_3$
7.7 per cent of $SO_2$
0.96 per cent of $SiO_2$, the remainder being water.

The filtrate contains all the iron and small amounts of alkali.

Example III

If a pre-calcined clay be leached for about 15 hours with a 20–30 per cent (i. e. supersaturated) aqueous sulfurous acid, at a temperature of about 70° C., the pressure attaining 10–12 atmospheres, an aluminum sulfite liquor of 4 to 5 per cent strength is obtained. The yield of alumina, referred to the aluminum oxide originally present in the clay, reaches satisfactory values, for example 85 per cent.

What we claim is:—

1. In the decomposition of siliceous aluminous minerals by sulfurous acid for extraction of alumina in available form, a process which comprises treating the ground and calcined mineral in aqueous suspension at temperatures between 50 and 80° C. with $SO_2$ under pressure and in quantity such as to form a solution containing from 10 to 40 grams $Al_2O_3$ per liter and substantially free of silica, separating said solution from the insoluble residue and recovering alumina from the separated solution.

2. In the decomposition of siliceous aluminous minerals by sulfurous acid for extraction of alumina in available form, a process which comprises treating the ground and calcined mineral in aqueous suspension at temperatures between 50 and 80° C. with $SO_2$ under pressure and in quantity such as to form a supersaturated aqueous solution of $SO_2$ between 10 and 50 per cent in strength.

3. In the process of recovering aluminum values from clays, kaolins, leucites, high-silica bauxites and other siliceous-aluminiferous minerals, the steps which comprise extracting such a mineral with an aqueous solution of $SO_2$, raising the temperature during said extraction by the application of external heat to values ranging from about 50 to 80° C., maintaining the $SO_2$ in sufficient excess to prevent decomposition of the aluminum sulfite solutions thereby formed, continuing the extraction until a solution is formed containing a substantial amount of $Al_2O_3$ but substantially free from $SiO_2$, separating said solution from the insoluble residue and recovering the extracted aluminum values from the separated solution.

4. The process of claim 3 wherein the extraction is conducted at substantially atmospheric pressure, $SO_2$ being introduced into the extraction zone at least as rapidly as it is consumed.

5. The process of claim 3 wherein the extraction is conducted under a superatmospheric pressure of $SO_2$.

6. The process of claim 3 wherein the mineral is calcined prior to extraction for removal of water of hydration.

7. The process of claim 3 wherein the extraction is conducted with an aqueous solution of $SO_2$ containing not substantially less than 10 per cent and not substantially more than 50 per cent $SO_2$ by weight.

ERICH WIEDBRAUCK.
KARL BÜCHE.